(12) United States Patent
Yelverton (10) Patent No.: US 9,220,369 B1
(45) Date of Patent: Dec. 29, 2015

(54) DEEP FRYER APPARATUS

(71) Applicant: John W. Yelverton, Fort Walton Beach, FL (US)

(72) Inventor: John W. Yelverton, Fort Walton Beach, FL (US)

(73) Assignee: John W. Yelverton, Fort Walton Beach, FL (US)

( * ) Notice: Subject to any disclaimer, the term of this patent is extended or adjusted under 35 U.S.C. 154(b) by 693 days.

(21) Appl. No.: 13/633,395

(22) Filed: Oct. 2, 2012

Related U.S. Application Data (60) Provisional application No. 61/626,744, filed on Oct. 3, 2011.

(51) Int. Cl.
*A47J 37/12* (2006.01)
*A47J 36/20* (2006.01)

(52) U.S. Cl.
CPC ................................ *A47J 37/1223* (2013.01)

(58) Field of Classification Search
None
See application file for complete search history.

(56) References Cited

U.S. PATENT DOCUMENTS

| | | | | |
|---|---|---|---|---|
| 523,643 A * | 7/1894 | Pack | A47J 36/20 99/412 |
| 554,996 A * | 2/1896 | Erlam | A47J 36/20 99/412 |
| 902,181 A | 10/1908 | Tidow | |
| 948,198 A * | 2/1910 | Wiegand | A47J 27/04 99/417 |
| 952,572 A * | 3/1910 | Meyer | A47J 27/04 220/228 |
| 1,326,942 A * | 1/1920 | Lochner | A47J 36/20 47/79 |
| 1,434,262 A * | 10/1922 | Patterson | A47J 36/20 126/387.1 |
| 1,623,703 A * | 4/1927 | Ruff | A47J 36/20 134/157 |
| 1,697,930 A * | 1/1929 | Schaefer | A47J 36/20 126/387.1 |
| 1,753,895 A * | 4/1930 | Larson | A47J 36/20 126/369 |
| 1,907,265 A | 5/1933 | Schwedersky | |
| 1,909,983 A * | 5/1933 | Powell | A47J 36/20 220/529 |
| 1,922,419 A * | 8/1933 | Coulston | A47J 36/20 126/215 |
| 1,955,842 A * | 4/1934 | Vial | A47J 36/20 294/26.5 |
| 2,040,004 A * | 5/1936 | Kelsay | A47J 36/20 126/369 |
| 2,071,467 A | 2/1937 | Kouvallis | |
| 2,136,535 A * | 11/1938 | Anetsberger | A47J 37/1204 126/387.1 |
| 2,425,699 A * | 8/1947 | Kuehn | A47J 37/1204 99/408 |
| 2,570,628 A | 10/1951 | Anetsberger | |
| 2,588,614 A * | 3/1952 | Amneris | A47J 36/20 99/410 |
| 2,650,485 A * | 9/1953 | La Greca | A47G 19/02 210/244 |
| 2,650,536 A * | 9/1953 | Russell | A47J 36/20 126/369 |
| 2,667,117 A * | 1/1954 | Millard | A47J 36/20 16/425 |
| 3,392,845 A * | 7/1968 | Shapiro | A47J 43/22 210/470 |
| 3,704,142 A * | 11/1972 | Wilson | A47J 36/022 4/144.1 |
| 3,933,645 A * | 1/1976 | Keramidas | A47J 37/1223 210/305 |
| 3,937,136 A * | 2/1976 | Cox | A47J 37/1223 210/493.3 |
| 4,138,939 A * | 2/1979 | Feld | A47J 43/24 99/418 |
| 4,164,174 A * | 8/1979 | Wallsten | A47J 36/022 220/23.87 |
| 4,677,906 A * | 7/1987 | Lowe | A47J 36/20 206/804 |
| 4,739,698 A * | 4/1988 | Allaire | A47J 27/04 126/369 |

(Continued)

*Primary Examiner* — Robert James Popovics (57) ABSTRACT

An apparatus for trapping loose food particles in a deep frying vessel has been developed. The apparatus includes a top plate that has a perforated region that allows the loose food particles to fall into the trap pan which sits off the bottom of the vessel. The top plate abuts the side wall of the vessel and sits over the trap pan. The top plate has an unperforated region over any gap between the trap pan and the side wall of the vessel.

17 Claims, 9 Drawing Sheets

(56) References Cited

U.S. PATENT DOCUMENTS

| | | | | |
|---|---|---|---|---|
| 4,787,301 A | * | 11/1988 | Hoatson | A47J 37/12 219/422 |
| 4,793,324 A | * | 12/1988 | Caferro | A21B 1/02 126/369 |
| 5,033,369 A | * | 7/1991 | Wu | A47J 37/1295 210/167.28 |
| 5,044,265 A | * | 9/1991 | Janssen | A47J 36/20 99/418 |
| 5,184,539 A | | 2/1993 | Oiwa | |
| 5,199,347 A | * | 4/1993 | Chen | A47J 36/20 126/369 |
| 5,510,028 A | * | 4/1996 | Kuhlman | A47J 43/284 210/307 |
| 5,517,902 A | * | 5/1996 | Boston | A47J 37/0704 126/25 R |
| 6,176,175 B1 | * | 1/2001 | Moreth | A47J 37/1295 99/408 |
| 6,364,120 B1 | * | 4/2002 | Sanchez | A47J 37/1223 210/167.28 |
| 6,378,420 B1 | * | 4/2002 | Savage | A47J 37/1223 210/167.28 |
| 6,786,139 B2 | | 9/2004 | Ponting et al. | |
| 7,172,705 B2 | * | 2/2007 | Cooper | A47J 36/20 210/776 |
| 7,185,766 B2 | * | 3/2007 | Cooper | A47J 36/20 210/470 |
| 8,307,759 B2 | * | 11/2012 | Ketter, Jr. | A47J 37/1295 210/455 |
| 2009/0283482 A1 | * | 11/2009 | Owen | A47J 36/20 210/774 |
| 2013/0341258 A1 | * | 12/2013 | Sekora | A47J 37/1295 210/167.28 |
| 2015/0114238 A1 | * | 4/2015 | Palermo | A47J 37/0623 99/401 |

* cited by examiner

FIG. 8d
(90 degree rotation from FIG. 8c)

DEEP FRYER APPARATUS

CROSS-REFERENCE TO RELATED APPLICATIONS

This application claims priority from U.S. Provisional Application No. 61/626,744 titled "INSERT TO TRAP LOOSE PARTICLES WITHIN A DEEP FRYER VESSEL" that was filed on Oct. 3, 2011.

FIELD OF THE INVENTION

The present invention relates generally to an apparatus for a deep fryer. More specifically, the present invention relates to a removable apparatus for a deep fryer that traps loose food particles.

BACKGROUND ART

When deep frying food, loose food particles may naturally occur. These loose particles generally settle at the bottom of the cooking vessel where they quickly become scorched due to their exposure to the high heat transfer area found at the bottom of the deep frying vessel. The scorched food particles can easily impart an undesirable flavor to both the cooking oil and the food being prepared for consumption. As the loose food particles build up on the bottom of the vessel they can also restrict heat transfer to the oil, which can make food come out soggy and greasy due to not being fried at a consistent optimal temperature. Therefore, it is advantageous to have an apparatus that traps loose food particles and prevents their scorching and build up on the bottom of a vessel used for deep frying.

SUMMARY OF THE INVENTION

In some aspects, the invention relates to an apparatus for trapping loose food particles in a deep frying vessel, comprising: a trap pan for collecting loose food particles, comprising, a solid bottom, a flange extending perpendicularly upward from the exterior edge of the solid bottom, multiple legs extending downward below the trap pan bottom and above the top of the flange, one or more handles attached to the side of the trap pan for lowering and raising the pan inside the deep frying vessel; and a top plate that abuts the interior sidewalls of the deep frying vessel, comprising, a perforated region located in the interior of the, top plate surface, an unperforated region located along the periphery of the top plate surface, one or more handles attached to the top plate for lowering and raising the top plate inside the deep frying vessel so that the top plate rests on top of the legs of the trap pan.

In other aspects, the invention relates to an apparatus for trapping loose food particles in a deep frying vessel, comprising: means for filtering loose food particles in the cooking oil of the deep frying vessel while allowing convective flow of the cooking oil; and means for collecting the filtered loose food particles in the cooking oil of the deep frying vessel and holding the food particles away from the bottom of the cooking vessel.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The present invention relates to an insert that is removably placed inside a deep fryer vessel wherein the device traps loose food particles, which naturally occur during the deep frying process, and prevents them from quickly becoming scorched on the bottom of the vessel where heat transfer to the oil is intended to take place. For convenience, if the amount or type of food being fried is not expected to produce sufficient loose particles to affect the flavor of the food, the vessel may be used without the device inserted in order to reduce the amount of oil required for cooking, The present invention is compatible with various stove top and outdoor gas burners ranges, which are intended to transfer heat to the bottom of a cooking vessel.

Referring now to the drawings, it is seen that the insert to trap loose particles within a deep fryer vessel of the present invention, generally denoted by reference numeral 10, is comprised of a body member or "trap pan" 12 that has a generally truncated frusto-conical shape with an open central top 14 and a downwardly and outwardly extending sloped sidewall 16. A circumferential upwardly extending flange 18 is located along the outer periphery of the body member 12. The height of the circumferential flange 18 approximates the height of the body member 12 at the open top 14. However, the height of the flange 18 may be lesser or greater than the body member 12 in other embodiments. A series of legs 20 extends downwardly from the flange 18. If desired, a ring member 22 can medially encompass the body member 12 in order to trap some particles away from the flange 18 to prevent excessive buildup. The body member 12 and the top plate 24 including its flange 26 are made from any appropriate material that can withstand the harsh environment found within a deep fryer vessel V including steel, stainless steel, aluminum, cast iron, etc.

Figure 1:
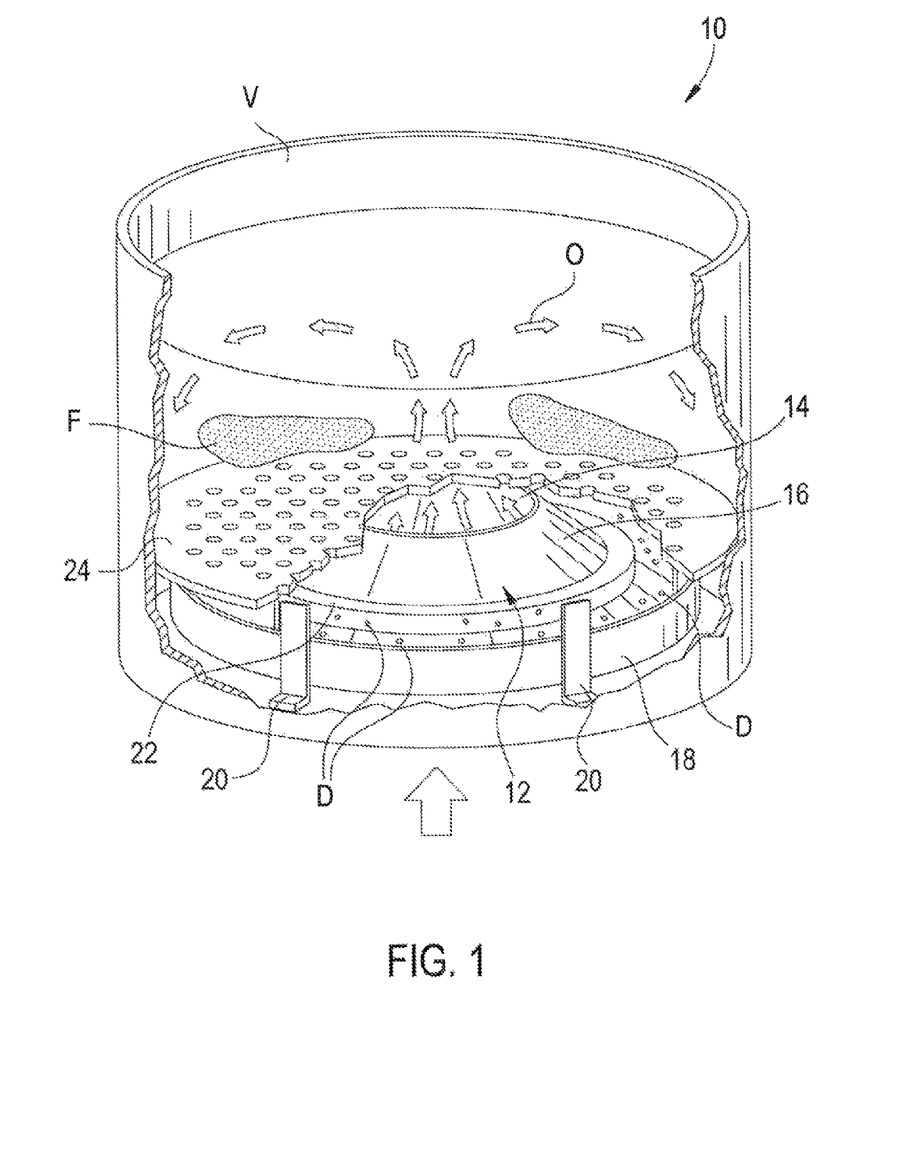
FIG. 1 is a perspective view, partially cutaway, of the insert to trap loose particles within a deep fryer vessel of the present invention, being used during food deep frying, the food free floating within the frying oil in accordance with one embodiment of the present invention.
Figure 2:
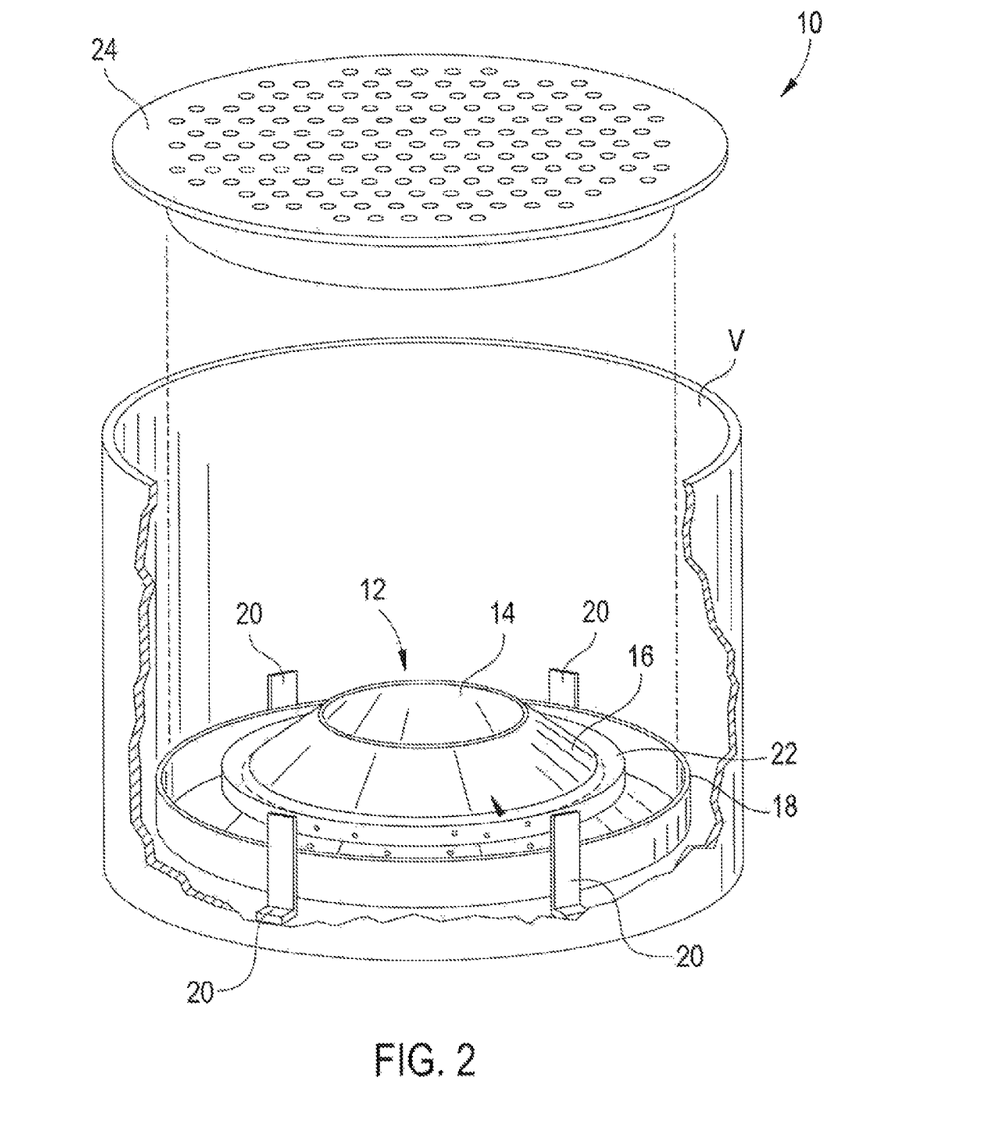
FIG. 2 is a perspective view, partially exploded, of the insert to trap loose particles within a deep fryer vessel in accordance with one embodiment of the present invention.
Figure 3:
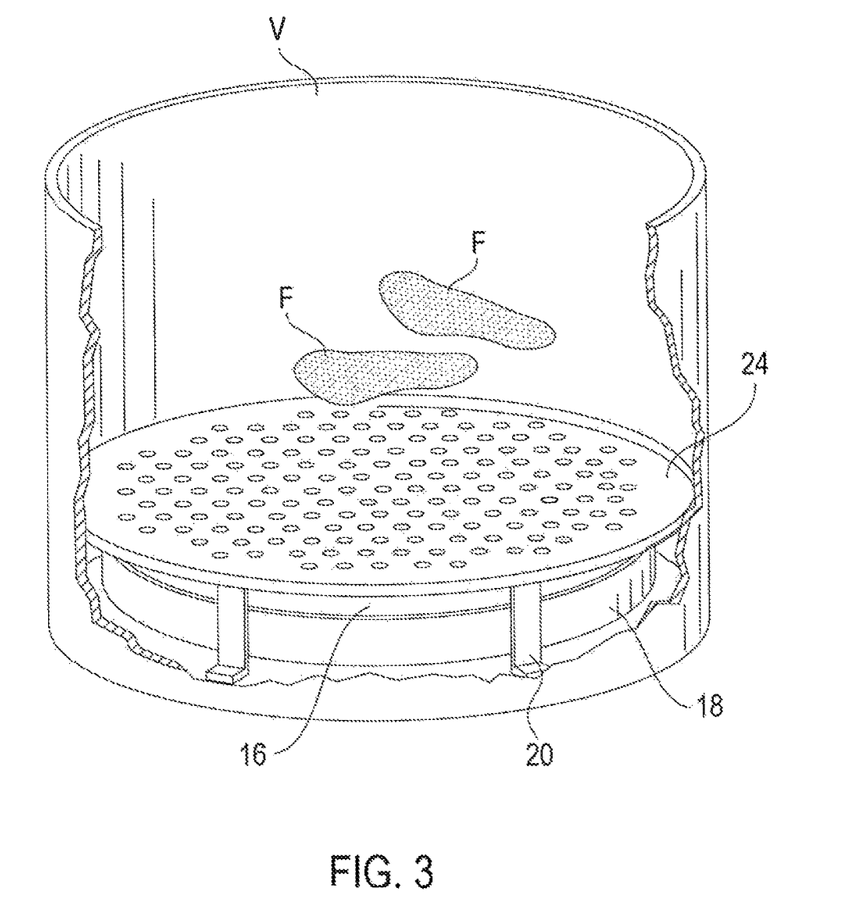
FIG. 3 is a perspective view, partially cutaway, of the insert to trap loose particles within a deep fryer vessel, being used during food deep frying in accordance with one embodiment of the present invention.
Figure 4:
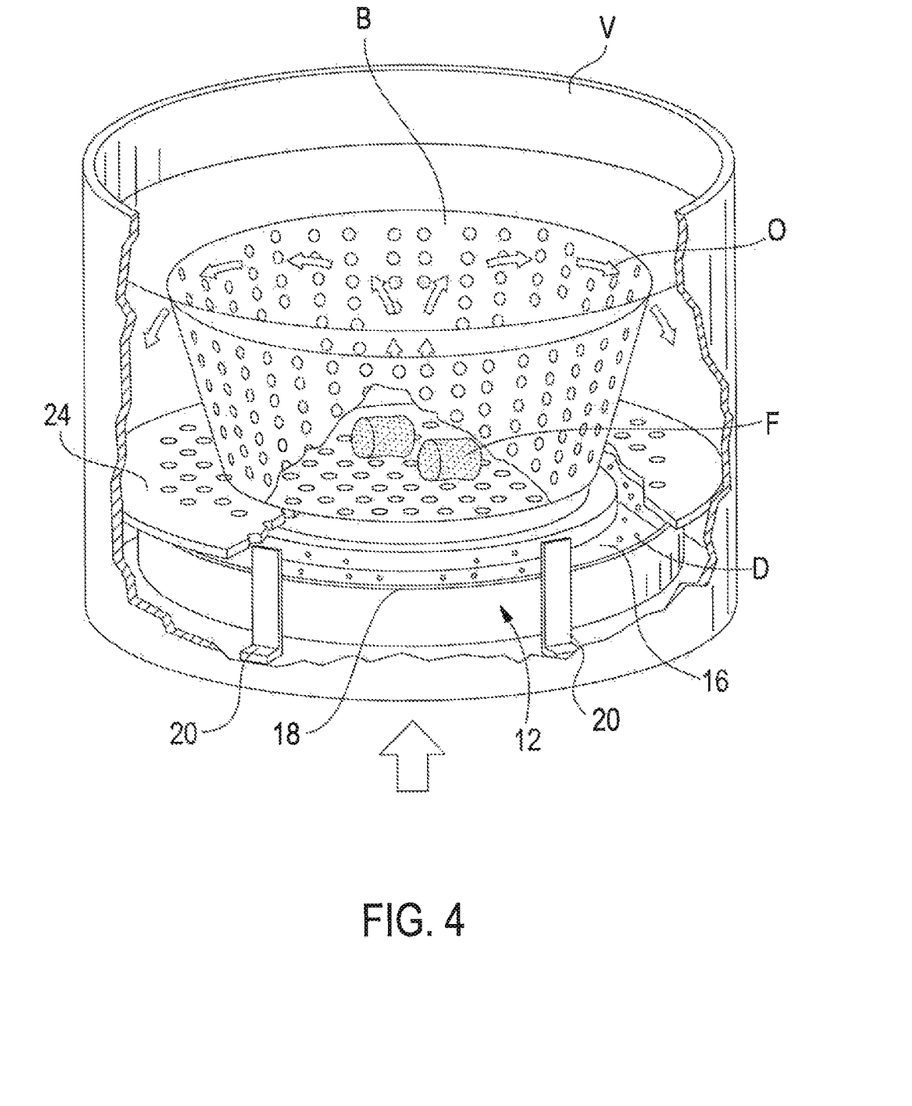
FIG. 4 is a perspective view, partially cutaway, of the insert to trap loose particles within a deep fryer vessel, being used during food deep frying using a basket to contain the food in accordance with one embodiment of the present invention.

In order to use the insert to trap loose particles within a deep fryer vessel 10 of the present invention, the body member 12 is positioned within the deep fryer vessel V. The legs 20 hold the body member up and off the base of the vessel V. The plate 24 is positioned so as to seat atop the body member 12 as previously described. The vessel V is filled with an appropriate frying liquid O and food F is fried therein either in free float fashion as best seen in FIGS. 1 and 3, or via an appropriate fry basket B as seen in FIG. 4. The oil O within the deep fryer vessel V rises, through convective flow, upwardly through the open top 14 of the body member 12 and once the oil O cools, the oil O drops toward the bottom of the vessel V. Once the oil O contacts the sloped sidewall 16 of the body member 12 and travels downwardly toward the circumferential flange 18. Once the oil O reaches the flange 18, the oil O rolls over the top of the flange 18 and then heads downwardly on the outside of the flange 18 toward the bottom of the vessel V until the oil O heats up again and begins the upward travel cycle through the open top 14 of the body member 12. When the oil O hits the circumferential flange 18, small food particles D being carried by the oil O, are held proximate the base of the flange 18 as the oil O has insufficient flow energy to take these food particles D over the top of the flange 18. These small food particles 1) remain "trapped" proximate the base of this flange 18 of the base member 12 until they are removed by a user. By remaining trapped proximate the base of the flange 18, these small food particles D, which become burnt with sufficient indwell time in the oil O, do not come in contact with the food proper F so as to not impart an undesirable look and taste to such food F. Additionally, by being trapped off of the bottom of the vessel V (where such particles D often migrate to), the small food particles D are not exposed to the maximum area of heat transfer within the vessel V, thereby reducing the particles' ability to become scorched and impart an undesirable flavor to the food and oil O. By helping prevent these particles D from being scorched, any such particles D that become attached to food F being fried within the vessel V, do not impart an unpleasant taste or unsightly appearance to the food product F.

The circumferential flange 18 can be positioned inwardly from the outer circumference of the body member 12 (not illustrated) or a separate upwardly oriented flange (also not illustrated) can be used in addition to the circumferential flange 18 as desired, however, the use of the circumferential flange 18 positioned on the outer circumference of the body member 12 allows for ease of manufacture of the device 10 as well as gives the body member 12 rigidity, especially if a ring member 22 is not used.

Advantageously, the width of the body member 12 is such so as to approximate the inside diameter of the vessel V so as to catch the maximum of loose food particles D. Of course the device 10 can be made in a variety of sizes to match the size of the vessel V within which the device 10 is being used.

Figure 5:
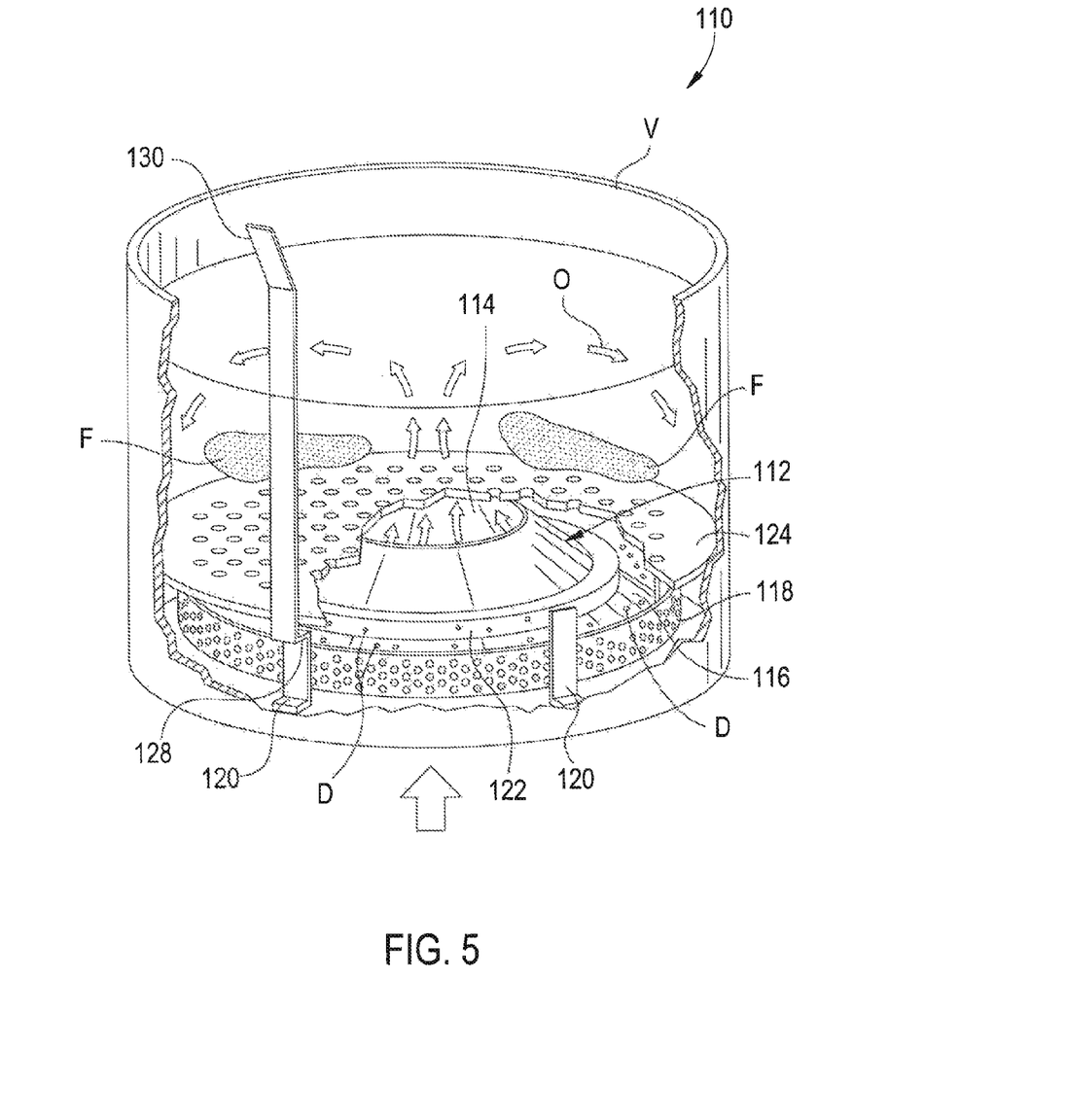
FIG. 5 is a perspective view, partially cutaway, of an alternate embodiment of the insert to trap loose particles within a deep fryer vessel of the present invention, being used during food deep frying in accordance with one embodiment of the present invention.

As seen in FIG. 5, an alternate embodiment of the insert to trap loose particles within a deep fryer vessel 110 uses a body member 112 as described before with an open central top 114 and a downwardly extending sloped sidewall 116 and an optional ring member 122. In this embodiment 110, the circumferential flange 118 is perforated. Additionally, the plate 124 is positioned by being seated on ridges 128 located on at least some of the legs 120. Additionally, one or more of the legs 120 may have an extension 130 that rises upwardly a sufficient height (preferably to a height that is above the rim of the vessel V) and acts as a handle for the device 110. If desired, a separate additional perforated flange positioned inwardly from the circumferential flange 118 (as described previously) can be used. Of course the device can be any appropriate combination of elements found within the two embodiments 10 and 110 so that, for example, a non-perforated circumferential flange 18 can be configured with the second embodiment 110 and plate 124 so that the legs 120 have a ridge 128 thereon to help seat the plate 124.

Figure 6:
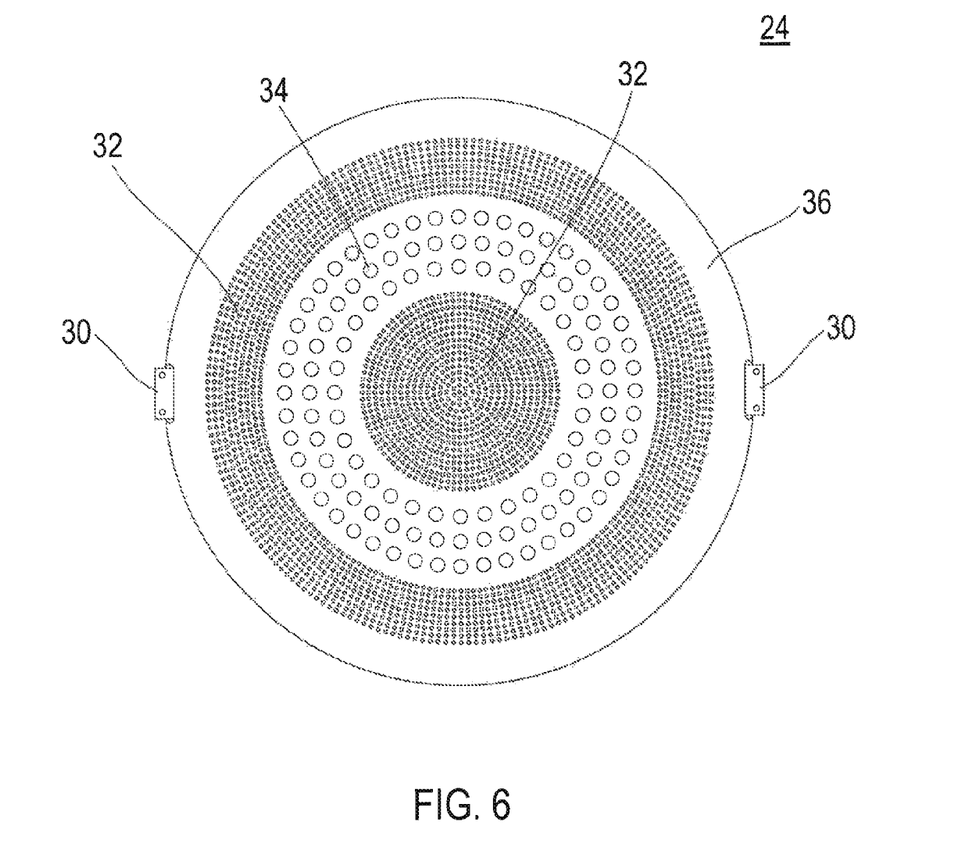
FIG. 6 shows an overhead view of the perforated plate in accordance with one embodiment of the present invention.

FIG. 6 shows an overhead view of an alternative embodiment of the perforated plate. This embodiment has an outer region 32 and a central region 32 with smaller perforations in the plate 24. The inner region 34 has larger sized perforations to allow larger particles to pass through and be captured in the trap pan 12. The smaller perforations near the un-perforated or "imperforate" region 36 on the outer periphery of the top-plate 24 help diffuse so called "burps" in the cooking oil. Burps are caused when moisture released from the food is trapped in the oil and circulates between the vessel bottom and the trap-pan where it is heated, which causes it to expand rapidly and rise to the surface of the oil as a burp. It should be clear that variations in perforation size, location and pattern can be used in other embodiments.

Figure 7A:
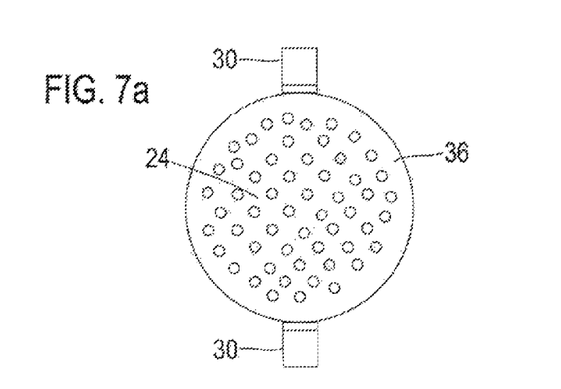
FIGS. 7a-7c show views of an angled trap bottom plate in accordance with one embodiment of the present invention.
Figure 7B:
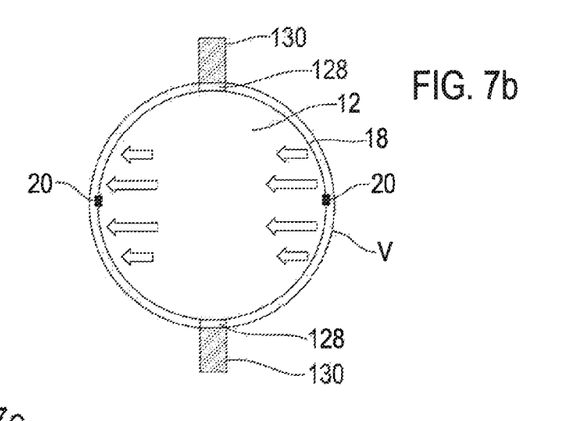
Figure 7C:
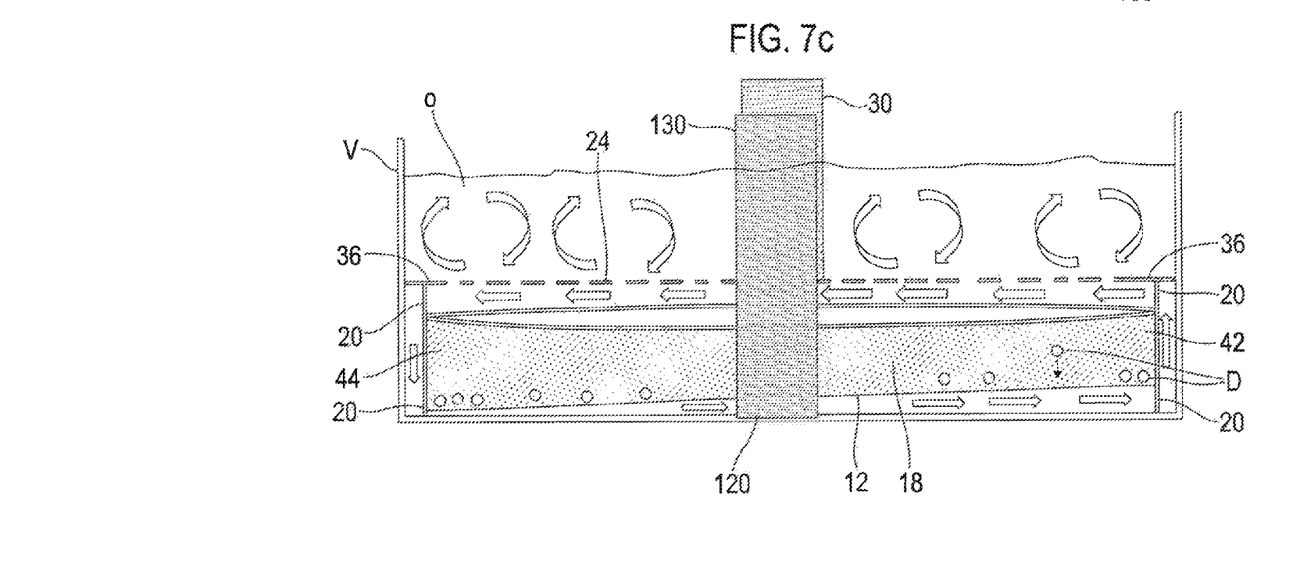

FIGS. 7a-7c show views of an angled trap pan bottom plate in accordance with one embodiment of the present invention. FIG. 7a shows an overhead view of the top plate 24 with an unperforated region around the periphery 36 of the surface. FIG. 7b shows an overhead view of the trap pan 12 placed inside the vessel V without the top plate 24 installed. FIG. 7c shows a side cutaway view of the vessel V with the trap pan 12 and the top plate 24 installed. In this embodiment, a solid trap pan 12 that is elevated from the vessel V bottom and has a slight incline angle (i.e., is not parallel to the bottom of the pot). The handles 30 and 130 are not at the lowest and highest trap depth areas as shown, but rotated 90 degrees in relation to the upper end 42 and lower end 44 of the trap pan 12. The legs 20 extending below the trap pan 12 proximate to the upper end 42 are shorter than the legs proximate to the lower end 44 in order to create the incline. Accordingly, the height of the flange proximate to the upper end 42 is higher than the flange proximate to the lower end 44.

The angle of incline is slight but guides the convection flow of the of O as it heats. The hotter oil O will want to rise and naturally flow towards the upper end 42 of the trap pan 12. After the oil O rises generally in the space between the trap pan flange 18 and the sidewall of the vessel V, the imperforated area 36 of the top plate that abuts the sidewall of the vessel V and extends inward beyond the flange 18 directs the oil O flow laterally through the gap between the top plate and the trap pan flange 18 that is proximate to the upper end 42 where it then continues to laterally flow across the trap pan in the direction of the lower end 44, but also rising upward through the perforations in the top plate 24.

In this embodiment, the top plate is perforated throughout the center area with no distinct openings specifically for the oil O flow upward or downward. Cooler oil O will naturally be displaced by the rising hot oil O and be forced to flow downward toward the bottom of the vessel V where it is reheated. In this way, the convection driven circulation of oil O flow is induced. With sufficient heating, the directional oil O flow established between the trap pan 12 and bottom interior surface of the vessel V helps create a rapid flow rate of oil O that jets some ultrafine particles D that reach the bottom of the vessel V back upward into the trap pan 12 where they are captured. In another embodiment, the trap pan 12 may include a removable liner within the trap pan. The liner will collect food particles D in the trap pan and allow easier emptying by simply removing the liner. The liner may be made of aluminum foil, aluminum, steel, stainless steel or other suitable material.

Figure 8A:
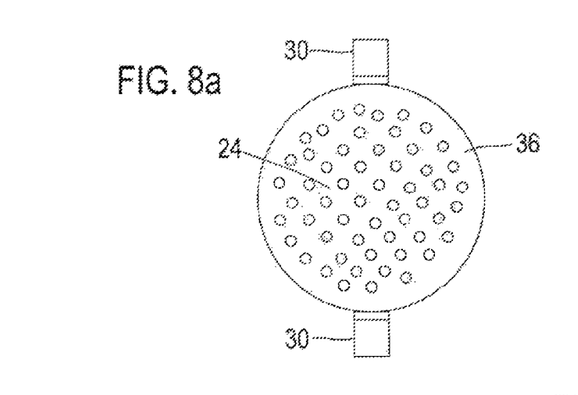
FIGS. 8a-8d show views of the present invention with a flat trap bottom and handles for the top plate and funnel trap in accordance with one embodiment of the present invention.
Figure 8B:
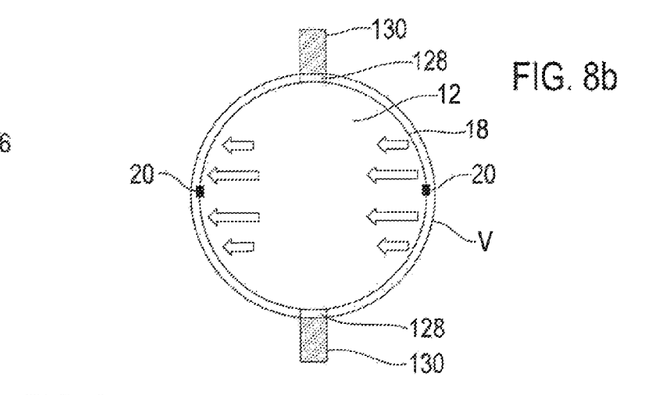
Figure 8C:
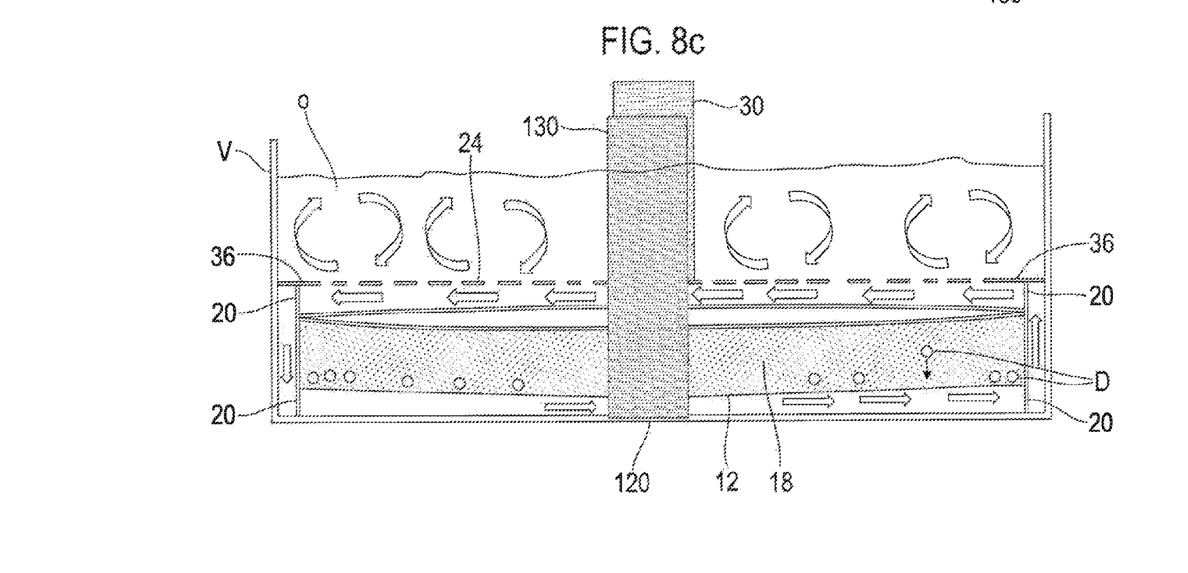
Figure 8D:
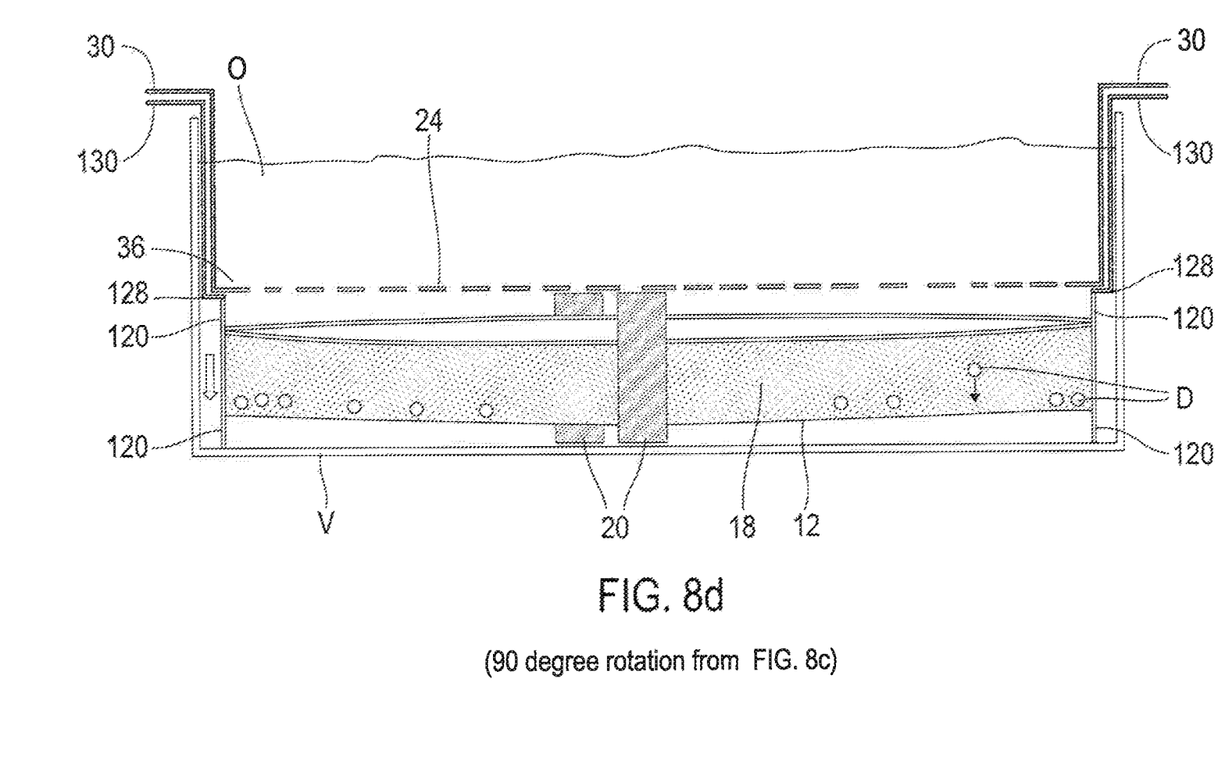

FIGS. 8a-8d show another preferred embodiment of the present invention with handles for the top plate 24 and trap pan 12. FIG. 8a shows an overhead view of the top plate 24 with an unperforated region around the periphery 36 of the surface. FIG. 8b shows an overhead view of the trap pan 12 placed inside the vessel V without the top plate 24 installed. FIG. 8c shows a side cutaway view of the vessel V with the trap pan 12 and the top plate 24 installed. FIG. 8d shows the same cut away view of parts as 8c but rotated 90 degrees. In this view, the top plate 124 rests on support ridges 128 that is located on the legs 120. In other embodiments, the support ridges 128 may be on some but not all of the legs 120. In still another embodiment, the support ridge 128 may be a single ring that is mounted on the legs 120 and extends around the circumference of the trap pan 12. The ring support ridge may be unperforated and function in a similar manner as the unperforated region of the top plate. Specifically, the ring support ridge abuts the interior vessel wall and prevents food particles from falling between the trap pan flange and the vessel wall.

In this embodiment, no angle or slope is specifically designed into the trap pan 12. Instead, natural variations and the unevenness of the vessel V help establish a dominant "funneled" flow path of the oil O. This embodiment of the trap pan 12 maximizes the volume of loose food particles D that can be trapped for a specific volume of cooking oil O. The trap pan 12 is a solid surface with a flange wall 18 around the peripheral edge of the bottom surface of the trap pan 12. Multiple legs 20 are attached to the trap pan 12 in order to elevate it from the bottom of the vessel. Each leg 20 extends below the trap pan 12 and above the flange 18. The legs 20 elevate the trap pan 12 off of the bottom of the deep fryer vessel V in order to allow oil to flow along the interior bottom of the vessel where maximum heat transfer to the oil takes place. The legs 20 also keep the trap pan 12 off of the bottom of the deep fryer vessel V in order to separate any food particles D caught at the bottom of the trap pan 12 from the intense heat transfer area on the bottom of the vessel, which could cause them to rapidly become scorched. The legs 20 that extend upward support the top plate 24 once it is placed in the fryer and create a gap between the top plate 24 and trap pan flange wall 18, which allows oil to convectively flow to and from the bottom of the vessel where heat transfer takes place.

The perforated top plate 24 provides a bottom to support a cooking basket. In this embodiment, an imperforate region 36 is included along the exterior region of the top plate 24. The top plate 24 is sized to abut the interior sidewall of the vessel V in order to prevent food particles D from falling directly down between the gap between the sidewall of the vessel and the trap pan flange. The trap pan 12 is slightly smaller in circumference than the vessel V in order to allow oil to connectively flow to and from the bottom of the vessel where maximum heat transfer takes place. The imperforate region 36 of the top plate 24 will cover the gap between the vessel wall V and the flange 18 of the trap pan 12 and the gap between the top plate and the flange. The imperforate region 36 prevents food particles D from falling through the top plate 24 and getting down to the bottom of the vessel V. Instead, the particles D fall through the perforations that is located directly over the trap pan 12 and are captured there and held in place by the flange 18. While the unperforated region is shown in this embodiment as a solid surface, in other embodiments the unperforated region could be made of a mesh screen. Such a screen would be fine enough to capture food particles, but still allow oil to flow through its surface.

The trap pan 12 and top plate 24 both have handles 30 so that they can easily he removed from the oil, and the breading in the trap easily removed. Two handles 30 and 130 are shown in this embodiment. However, alternative embodiments could use different numbers and styles of handles.

In this embodiment, both the top plate 24 and the trap pan 12 are circular in shape. However, other embodiments could utilize different shapes such as a square, rectangle, etc. In this embodiment, the heated oil rises upward and is guided by the bottom of trap pan 12 to one side of the vessel V from natural variations in the design and the unevenness of the vessel V. The oil rises vertically between the trap pan flange 18 and the sidewall of the vessel V, the imperforated area 36 of the top plate directs the oil O flow laterally through the gap between 36 and the trap pan flange 18 where it then continues to laterally flow across the top of trap pan 12, but also upward through the perforated area in the top plate 24. Cooler oil O will naturally be displaced by the rising hot oil O and forced to flow downward toward the bottom of the vessel V where it is reheated. In this way, the convection driven circulation flow is induced.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should he limited only by the attached claims.

What is claimed is:

1. An apparatus for trapping loose food particles in a deep frying vessel, comprising:
   a trap pan for collecting loose food particles, comprising,
      a solid bottom,
      a flange extending perpendicularly upward from the exterior edge of the solid bottom,
      multiple legs extending downward below the trap pan bottom and above the top of the flange,
      one or more handles attached to the side of the trap pan for lowering and raising the pan inside the deep frying vessel; and
   a top plate that abuts the interior sidewalls of the deep frying vessel, comprising,
      a perforated region located in the interior of the top plate surface,
      an unperforated region located along the periphery of the top plate surface,
      one or more handles attached to the top plate for lowering and raising the top plate inside the deep frying vessel so that the top plate rests on top of the legs of the trap pan.

2. The apparatus of claim 1, where the trap pan bottom has one or more openings that extend upward from the trap pan bottom.

3. The apparatus of claim 2, where the opening in the trap pan bottom is conically shaped extending upward from the trap pan bottom.

4. The apparatus of claim 1, where the trap pan sits at a slight inclined angle relative to the bottom of the deep flying vessel.

5. The apparatus of claim 1, where the trap pan sits at an inclined angle relative to the horizontal axis of the deep frying vessel.

6. The apparatus of claim 5, where the top plate is perforated throughout the center area with no distinct openings for the oil flow upward or downward through the top-plate.

7. The apparatus of claim 1, where the top plate has multiple perforations of differing sizes and/or patterns.

8. The apparatus of claim 1, where the unperforated region of the top plate comprises a solid surface.

9. The apparatus of claim 1, where the trap pan and top plate are made of stainless steel.

10. The apparatus of claim 1, where the trap pan and top plate are made of steel.

11. The apparatus of claim 1, where the trap pan and top plate are made of aluminum.

12. The apparatus of claim 1, where the trap pan and top plate are generally circular shaped.

13. The apparatus of claim 1, where the trap pan and top plate are generally square shaped.

14. The apparatus of claim 1, where the trap pan and top plate are generally rectangular shaped.

15. The apparatus of claim 4, where the top plate is perforated throughout the center area with no distinct openings for the oil flow upward or downward through the top-plate.

16. The apparatus of claim 1, where the flange is perforated.

17. The apparatus of claim 1, where the flange comprises a metal mesh.

\* \* \* \* \*